(12) United States Patent
Kurita et al.

(10) Patent No.: US 10,938,019 B2
(45) Date of Patent: Mar. 2, 2021

(54) POSITIVE ELECTRODE ACTIVE MATERIAL FOR LITHIUM SECONDARY BATTERIES, POSITIVE ELECTRODE FOR LITHIUM SECONDARY BATTERIES, AND LITHIUM SECONDARY BATTERY

(71) Applicants: SUMITOMO CHEMICAL COMPANY, LIMITED, Tokyo (JP); TANAKA CHEMICAL CORPORATION, Fukui (JP)

(72) Inventors: Hiroyuki Kurita, Tsukuba (JP); Kenji Takamori, Tsukuba (JP); Yuichiro Imanari, Tsukuba (JP); Takaaki Masukawa, Fukui (JP); Daisuke Yamashita, Fukui (JP); Kimiyasu Nakao, Fukui (JP)

(73) Assignees: SUMITOMO CHEMICAL COMPANY, LIMITED, Tokyo (JP); TANAKA CHEMICAL CORPORATION, Fuku (JP)

( * ) Notice: Subject to any disclaimer, the term of this patent is extended or adjusted under 35 U.S.C. 154(b) by 711 days.

(21) Appl. No.: 15/314,317

(22) PCT Filed: May 27, 2015

(86) PCT No.: PCT/JP2015/065269
§ 371 (c)(1),
(2) Date: Nov. 28, 2016

(87) PCT Pub. No.: WO2015/182665
PCT Pub. Date: Dec. 3, 2015

(65) Prior Publication Data
US 2017/0187031 A1 Jun. 29, 2017

(30) Foreign Application Priority Data

May 29, 2014 (JP) .............................. JP2014-111713
Dec. 25, 2014 (JP) .............................. JP2014-262692

(51) Int. Cl.
*H01M 4/131* (2010.01)
*H01M 4/505* (2010.01)
(Continued)

(52) U.S. Cl.
CPC ............ *H01M 4/131* (2013.01); *C01G 53/50* (2013.01); *H01M 4/366* (2013.01); *H01M 4/505* (2013.01);
(Continued)

(58) Field of Classification Search
CPC ...... H01M 4/505; H01M 4/525; H01M 4/131; H01M 4/366; H01M 10/0525;
(Continued)

(56) References Cited

U.S. PATENT DOCUMENTS

2002/0053663 A1   5/2002   Ito et al.
2007/0160906 A1   7/2007   Tooyama et al.
(Continued)

FOREIGN PATENT DOCUMENTS

CN   101276933 A   10/2008
CN   102208642 A   10/2011
(Continued)

OTHER PUBLICATIONS

International Search Report of PCT/JP2015/065269 dated Jul. 7, 2015.
(Continued)

*Primary Examiner* — Golam Mowla
(74) *Attorney, Agent, or Firm* — Sughrue Mion, PLLC (57) ABSTRACT

The object of the present invention is to provide a positive electrode active material usable for a lithium ion battery capable of high charge/discharge cycle performance and high discharge capacity. The positive electrode active material for a lithium secondary battery has a layered structure and comprises at least nickel, cobalt and manganese. Fur-
(Continued)

ther, the positive electrode active material satisfies requirements (1) to (3) below: (1) a primary particle size of 0.1 μm to 1 μm, and a 50% cumulative particle size $D_{50}$ of 1 μm to 10 μm, (2) a ratio ($D_{90}/D_{10}$) of volume-based 90% cumulative particle size $D_{50}$ to volume-based 10% cumulative particle size $D_{10}$ of 2 to 6, and (3) a lithium carbonate content in a residual alkali on particle surfaces of 0.1% by mass to 0.8% by mass as measured by neutralization titration.

10 Claims, 1 Drawing Sheet (51) Int. Cl.
*H01M 4/525* (2010.01)
*H01M 4/36* (2006.01)
*H01M 10/0525* (2010.01)
*H01M 10/0587* (2010.01)
*C01G 53/00* (2006.01)

(52) U.S. Cl.
CPC ....... *H01M 4/525* (2013.01); *H01M 10/0525* (2013.01); *H01M 10/0587* (2013.01); *C01P 2002/76* (2013.01); *C01P 2006/40* (2013.01); *H01M 2220/20* (2013.01); *H01M 2220/30* (2013.01)

(58) Field of Classification Search
CPC ......... H01M 10/0587; H01M 2220/20; H01M 2220/30; C01P 2006/40; C01P 2002/76; C01G 53/50
See application file for complete search history.

(56) References Cited

U.S. PATENT DOCUMENTS

| | | |
|---|---|---|
| 2008/0241647 A1 | 10/2008 | Fukui et al. |
| 2011/0240913 A1 | 10/2011 | Kim et al. |
| 2012/0074351 A1 | 3/2012 | Levasseur et al. |
| 2014/0011090 A1 | 1/2014 | Toya et al. |
| 2014/0308584 A1 | 10/2014 | Endo |
| 2015/0024273 A1 | 1/2015 | Yamazaki et al. |

FOREIGN PATENT DOCUMENTS

| | | |
|---|---|---|
| EP | 2 421 077 A1 | 2/2012 |
| JP | 2002-201028 A | 7/2002 |
| JP | 2004-193115 A | 7/2004 |
| JP | 2007-184145 A | 7/2007 |
| JP | 2008-147068 A | 6/2008 |
| JP | 2012054135 A | 3/2012 |
| JP | 2012-201539 A | 10/2012 |
| JP | 2014-041710 A | 3/2014 |
| WO | 2009/099158 A1 | 8/2009 |
| WO | 2012/128288 A1 | 9/2012 |
| WO | 2012/131881 A1 | 10/2012 |
| WO | 2013/069454 A1 | 5/2013 |
| WO | 2013/137380 A1 | 9/2013 |

OTHER PUBLICATIONS

Communication dated Jul. 9, 2018, from the State Intellectual Property Office of People's Republic of China in counterpart Application No. 201580027925.8.
Communication dated Apr. 9, 2019, from the Japanese Patent Office in counterpart Application No. 2016-523536.
Communication dated Apr. 10, 2019, from the China National Intellectual Property Administration in counterpart Application No. 201580027925.8.
Communication dated Jan. 5, 2018 from the European Patent Office in counterpart application No. 15800391.3.

POSITIVE ELECTRODE ACTIVE MATERIAL FOR LITHIUM SECONDARY BATTERIES, POSITIVE ELECTRODE FOR LITHIUM SECONDARY BATTERIES, AND LITHIUM SECONDARY BATTERY

CROSS REFERENCE TO RELATED APPLICATIONS

This application is a National Stage of International Application No. PCT/JP2015/065269 filed May 27, 2015, claiming priority based on Japanese Patent Application No. 2014-111713 filed May 29, 2014 and Japanese Patent Application No. 2014-262692 filed Dec. 25, 2014, the contents of all of which are incorporated herein by reference in their entirety.

TECHNICAL FIELD

The present invention relates to a positive electrode active material for lithium secondary batteries, a positive electrode for lithium secondary batteries and a lithium secondary battery.

BACKGROUND ART

Lithium-containing composite metal oxides are used as positive electrode active materials for lithium secondary batteries. Lithium secondary batteries have already been put to practical use not only as compact power supplies for portable telephones, notebook computers and the like, but also as medium- and large-sized power supplies for automobile use, electric power storage use, etc.

As a conventional positive electrode active material, Patent Document 1 discloses a positive electrode active material for a lithium secondary battery, which is a lithium-nickel-manganese-cobalt composite oxide and has a primary particle size of 1.8 μm and a lithium carbonate content of 0.39% by mass, wherein the lithium carbonate is a residual alkali on particle surfaces measured by neutralization titration.

DOCUMENTS OF RELATED ART

Patent Documents

Patent Document 1: International Patent Application Publication No. 2012/128288

DISCLOSURE OF INVENTION

Problems to be Solved by the Invention

However, a lithium secondary battery using the aforementioned conventional lithium-containing composite metal oxide as a positive electrode active material cannot ensure sufficient performance in applications requiring high charge/discharge cycle performance and high discharge capacity, e.g., applications in automobiles.

The present invention has been made in view of the above situation, and the object of the present invention is to provide a positive electrode active material for a lithium ion battery capable of high charge/discharge cycle performance and high discharge capacity. Further, the other objects of the present invention are to provide a positive electrode using such a positive electrode active material for a lithium secondary battery, and to provide a lithium secondary battery using such a positive electrode active material.

Means to Solve the Problems

In order to solve the aforementioned problems, the present invention in one embodiment provides a positive electrode active material for a lithium secondary battery, having a layered structure and comprising at least nickel, cobalt and manganese, the positive electrode active material satisfying requirements (1) to (3) below:
(1) a primary particle size of 0.1 μm to 1 μm, and a 50% cumulative particle size $D_{50}$ of 1 μm to 10 μm,
(2) a ratio ($D_{90}/D_{10}$) of volume-based 90% cumulative particle size $D_{90}$ to volume-based 10% cumulative particle size $D_{10}$ of 2 to 6, and
(3) a lithium carbonate content in a residual alkali on particle surfaces of 0.1% by mass to 0.8% by mass as measured by neutralization titration.

In one embodiment of the present invention, it is preferable that a value obtained by formula $(\alpha/\beta)/1000$, representing a relationship between crystallite size α (Å) within a peak region of $2\theta=18.7\pm1°$ in a powder X-ray diffraction measurement using CuKα radiation and BET specific surface area θ (m²/g), is 0.5 to 2.3.

In one embodiment of the present invention, the BET specific surface area β is 0.1 m²/g to 2.0 m²/g.

In one embodiment of the present invention, it is preferable that the crystallite size α (Å) within a peak region of $2\theta=18.7\pm1°$ in a powder X-ray diffraction measurement using CuKα radiation is 600 Å to 1,400 Å.

In one embodiment of the present invention, it is preferable that a total content of lithium carbonate and lithium hydroxide in a residual alkali on particle surfaces as measured by neutralization titration is 0.2% by mass to 1.5% by mass.

In one embodiment of the present invention, it is preferable that a value of $(D_{90}-D_{10})/D_{50}$, representing a relationship between the volume-based 10% cumulative particle size $D_{10}$, the volume-based 50% cumulative particle size $D_{50}$ and the volume-based 90% cumulative particle size $D_{90}$, is 1.00 to 2.20.

In one embodiment of the present invention, it is preferable that a powder conductivity under pressure of 6.37 kN/cm² is $1\times10^{-3}$ S/cm to $1\times10^{-1}$ S/cm.

In one embodiment of the present invention, it is preferable that the aforementioned layered structure has a composition represented by formula (1) below:

$$Li_aNi_{1-x-y-z}Mn_xCo_yM_zO_2 \qquad (I)$$

wherein a satisfies the following relationship: $0.9\leq a\leq 1.2$, x satisfies the following relationship: $0<x<0.4$, y satisfies the following relationship: $0<y<0.4$, z satisfies the following relationship: $0\leq z<0.1$, $1-x-y-z$ satisfies the following relationship $0.5<1-x-y-z\leq 0.65$, and M is at least one metal selected from the group consisting of Mg, Al and Zr.

The present invention in another aspect thereof provides a positive electrode comprising the aforementioned positive electrode active material for a lithium secondary battery.

The present invention in still another aspect thereof provides a lithium secondary battery comprising a negative electrode and the aforementioned positive electrode.

Effect of the Invention

According to the present invention, it becomes possible to provide a positive electrode active material for a lithium ion battery capable of high cycle performance and high discharge capacity. Further, it also becomes to provide a positive electrode using such a positive electrode active material for a lithium secondary battery, and to provide a lithium secondary battery using such a positive electrode active material. The positive electrode active material of the present invention for a lithium secondary battery is especially useful for a lithium secondary battery suitable for application in automobiles.

DESCRIPTION OF THE EMBODIMENTS

[Positive Electrode Active Material for Lithium Secondary Battery]

The positive electrode active material for a lithium secondary battery (hereinafter, simply referred to as "lithium-containing composite metal oxide) of the present embodiment has a layered structure and comprises at least nickel, cobalt and manganese, the positive electrode active material satisfying requirements (1) to (3) below:

(1) a primary particle size of 0.1 μm to 1 μm, and a 50% cumulative particle size $D_{50}$ of 1 μm to 10 μm,
(2) a ratio ($D_{90}/D_{10}$) of volume-based 90% cumulative particle size $D_{90}$ to volume-based 10% cumulative particle size $D_{10}$ of 2 to 6, and
(3) a lithium carbonate content in a residual alkali on particle surfaces of 0.1% by mass to 0.8% by mass as measured by neutralization titration.

Hereinbelow, the features of the positive electrode active material are explained.

The layered structure of the positive electrode active material of the present embodiment is preferably a layered structure having a composition represented by formula (I) below:

$$Li_aNi_{1-x-y-z}Mn_xCo_yM_zO_2 \qquad (I)$$

wherein a satisfies the following relationship: 0.9≤a≤1.2, x satisfies the following relationship: 0<x<0.4, y satisfies the following relationship: 0<y<0.4, z satisfies the following relationship: 0≤z<0.1, 1-x-y-z satisfies the following relationship 0.5<1-x-y-z≤0.65, and M is at least one metal selected from the group consisting of Mg, Al and Zr.

In the positive electrode active material for a lithium secondary battery of the present embodiment, for obtaining a lithium secondary battery with higher capacity, a in the formula (I) is preferably 0.95 or more, more preferably 0.98 or more, still more preferably 1.00 or more. For obtaining a lithium secondary battery with higher discharge capacity at high discharge rate, a in the formula (I) is preferably 1.18 or less, more preferably 1.15 or less, still more preferably 1.13 or less.

The upper limit values and lower limit values of a can be arbitrarily combined.

For obtaining a lithium secondary battery with higher cycle performance, x in the formula (I) is preferably 0.05 or more, more preferably 0.10 or more, still more preferably 0.15 or more. For obtaining a lithium secondary battery with higher storage stability under high temperature conditions (e.g., at 60° C.), x in the formula (I) is preferably 0.35 or less, more preferably 0.30 or less, still more preferably 0.28 or less.

The upper limit values and lower limit values of x can be arbitrarily combined.

For obtaining a lithium secondary battery with higher discharge capacity at even higher discharge rate, y in the formula (I) is preferably 0.05 or more, more preferably 0.10 or more, still more preferably 0.15 or more. For obtaining a lithium secondary battery with higher cycle performance, y in the formula (I) is preferably 0.3 or less, more preferably 0.25 or less, still more preferably 0.22 or less.

The upper limit values and lower limit values of y can be arbitrarily combined.

M in the formula (I) is at least one metal selected from the group consisting of Mg, Al and Zr.

For obtaining a lithium secondary battery with higher cycle performance, M is preferably Al and/or Zr. For obtaining a lithium secondary battery with higher thermal stability, M is preferably Mg and/or Al. For further enhancing the aforementioned effects, z in the formula (I) is preferably more than 0 and 0.08 or less, more preferably 0.005 or more and 0.05 or less, and still more preferably 0.008 or more and 0.02 or less.

For obtaining a lithium secondary battery with higher discharge capacity, 1-x-y-z in the formula (I) is preferably more than 0.50, more preferably 0.53 or more, still more preferably 0.55 or more. For improving the cycle performance, 1-x-y-z is preferably 0.64 or less, more preferably 0.63 or less, and still more preferably 0.62 or less.

The upper limit values and lower limit values of 1-x-y-z can be arbitrarily combined.

(Layered Structure)

Firstly, the crystal structure of the lithium-containing composite metal oxide in the present embodiment is a layered structure, and is more preferably a hexagonal crystal structure or a monoclinic crystal structure.

The hexagonal crystal structure belongs to any one of the space group selected from the group consisting of P3, P3$_1$, P3$_2$, R3, P-3, R-3, P312, P321, P3$_1$12, P3$_1$21, P3$_2$12, P3$_2$21, R32, P3 ml, P31m, P3c1, P31c, R3m, R3c, P-31m, P-31c, P-3 ml, P-3c1, R-3m, R-3c, P6, P6$_1$, P6$_5$, P6$_2$, P6$_4$, P6$_3$, P-6, P6/m, P6$_3$/m, P622, P6$_1$22, P6$_5$22, P6$_2$22, P6$_4$22, P6$_3$22, P6 mm, P6cc, P6$_3$ cm, P6$_3$mc, P-6m2, P-6c2, P-62m, P-62c, P6/mmm. P6/mcc, P6$_3$/mcm, and P6$_3$/mmc.

The monoclinic crystal structure belongs to any one of the space group selected from the group consisting of P2, P2$_1$, C2, Pm, Pc, Cm, Cc, P2/m, P2$_1$/m, C2/m, P2/c, P2$_1$/c, and C2/c.

Among the aforementioned crystal structures, since the discharge capacity of the obtained lithium secondary battery increases, the particularly preferable crystal structure of the positive electrode active material is a hexagonal crystal structure belonging to R-3m or a monoclinic crystal structure belonging to C2/m.

The space group of the lithium-containing composite metal oxide in the present embodiment can be confirmed by the following method.

First, the powder X-ray diffraction measurement is performed with respect to the positive electrode active material, wherein Cu-Kα is used as a radiation source and the measurement range of a diffraction angle 2θ is set in a range of 10° to 90°, subsequently, Rietveld analysis is performed on the basis of the result (the obtained powder X-ray diffraction pattern), and the crystal structure possessed by the lithium-containing composite metal oxide and the space group in the crystal structure are determined. The Rietveld analysis is a method in which the crystal structure of a material is analyzed using the data of diffraction peaks (diffraction peak intensity and diffraction angle 2θ) in the powder X-ray diffraction measurement of the material, which has been conventionally used (for example, refer can be made to "Practice of powder X-ray analysis-Introduction to the Rietveld method" published on Feb. 10, 2002, and edited by Conference for X-ray analysis in The Japan Society for Analytical Chemistry).

(Particle Diameter)

As to the form of particles of the positive electrode active material for a lithium secondary battery of the present embodiment, the positive electrode active material is in the form of secondary particles formed by aggregation of primary particles, or a mixture of primary particles and secondary particles formed by aggregation of primary particles. In the present embodiment, the primary particle diameter of the positive electrode active material is 0.1 μm to 1 μm. For obtaining a lithium secondary battery with high initial coulombic efficiency, the primary particle diameter is preferably 0.2 μm to 0.9 μm, more preferably 0.25 μm to 0.8 μm. The average primary particle diameter can be measured by the SEM observation.

In the present embodiment, the secondary particle diameter of the positive electrode active material is 1 μm to 10 μm.

For obtaining a lithium secondary battery with higher discharge capacity under low temperature conditions (e.g., at 0° C.), the secondary particle diameter is preferably 9 μm or less, more preferably 8 μm or less, and still more preferably 7 μm or less. For improving the electrode density, the secondary particle diameter is preferably 2 μm or more, more preferably 3 μm or more, and still more preferably 4 μm or more.

In the present embodiment, the "average secondary particle diameter" of the positive electrode active material indicates a volume-based 50% cumulative particle size $D_{50}$ measured by the following method (laser diffraction scattering method).

First, 0.1 g of a powder of the positive electrode active material was added to 50 ml of 0.2 wt % aqueous solution of sodium hexametaphosphate, thereby obtaining a dispersion with the powder dispersed therein.

The obtained dispersion is subjected to a particle size distribution measurement using a laser scattering particle size distribution measuring apparatus (Mastersizer MS2000, manufactured by Malvern Instruments Ltd.), whereby the volume-based particle size distribution curve is obtained.

From the obtained cumulative particle size distribution curve, the particle size at a 50% cumulation measured from the smallest particle side is determined as the volume-based 50% cumulative particle size ($D_{50}$) and as the secondary particle size of the positive electrode active material. Similarly, the particle diameter at a 10% cumulation measured from the smallest particle side is determined as the volume-based 10% cumulative particle size ($D_{10}$), and the particle diameter ($D_{90}$) at a 90% cumulation measured from the smallest particle side is determined as the 90% cumulative diameter.

In the positive electrode active material for a lithium secondary battery of the present embodiment, the ratio ($D_{90}/D_{10}$) of the volume-based 90% cumulative particle size $D_{90}$ to the volume-based 10% cumulative particle size $D_{10}$ of 2 to 6. For further improving the electrode density, the ratio ($D_{90}/D_{10}$) is preferably 2.2 or more, more preferably 2.4 or more. For improving the discharge capacity at even higher discharge rate, the ratio ($D_{90}/D_{10}$) is preferably 5.7 or less, more preferably 5.5 or less.

In the present embodiment, a smaller value of the ratio ($D_{90}/D_{10}$) means a narrower particle size distribution, and a larger value of the ratio ($D_{90}/D_{10}$) means a broader particle size distribution.

In the positive electrode active material of the present embodiment, it is preferable that a value of ($D_{90}-D_{10})/D_{50}$), representing a relationship between the volume-based 10% cumulative particle size D10, the volume-based 50% cumulative particle size $D_{50}$ and the volume-based 90% cumulative particle size $D_{90}$, is 1.00 to 2.20. For further enhancing the effects of the present invention, the value of ($D_{90}-D_{10})/D_{50}$) is more preferably 1.10 to 2.15, still more preferably 1.20 to 2.10.

(Crystallite Size)

In the positive electrode active material of the present embodiment, for obtaining a lithium secondary battery with higher discharge capacity, the crystallite size within a peak region of 2θ=18.7±1° (hereinafter, sometimes referred to as peak A) in a powder X-ray diffraction measurement using CuKα radiation is preferably 600 Å or more, more preferably 650 Å or more, and still more preferably 700 Å or more. For obtaining a lithium secondary battery with higher cycle performance, the crystallite size at the peak A is preferably 1.400 Å or less, more preferably 1,300 Å or less, and still more preferably 1,250 Å or less.

The upper limit values and lower limit values of the crystallite size at the peak A can be arbitrarily combined.

For obtaining a lithium secondary battery with higher discharge capacity at high current rate, the crystallite size within a peak region of 2θ=44.6±1° (hereinafter, sometimes referred to as peak B) is preferably 350 Å to 700 Å, more preferably 400 Å to 700 Å, still more preferably 450 Å to 700 Å, and still more preferably 500 Å to 675 Å. The upper limit values and lower limit values of the crystallite size at the peak B can be arbitrarily combined. For obtaining a lithium secondary battery with higher storage stability under high temperature conditions (e.g., at 60° C.), a value obtained by dividing the crystallite size at the peak A by the crystallite size at the peak B is preferably 0.8 to 2.8, more preferably 1.2 to 2.2.

In the present embodiment, the crystallite sizes at the peak A and the peak B can be confirmed as follows.

First, the powder X-ray diffraction measurement is performed with respect to the positive electrode active material, wherein Cu-Kα is used as a radiation source and the measurement range of a diffraction angle 2θ is set in a range of 10° to 90°, to thereby determine peaks corresponding to the peak A and the peak B. Then, the half width values of the determined peaks are calculated, from which the crystal sizes are calculated by Scherrer equation: D=Kλ/B cosθ (D: crystallite size, K: Scherrer constant, B: peak line width). The determination of crystallite size by the aforementioned formula is a technique that has been conventionally used for this purpose (see, for example, "X-ray structural analysis—determination of arrangement of atoms —", third edition issued Apr. 30, 2002, Yoshio Waseda, Eiichiro Matsubara).

(BET Specific Surface Area)

The BET specific surface area of the positive electrode active material of the present embodiment is preferably in a range of 0.1 $m^2/g$ to 2.0 $m^2/g$. By adjusting the BET specific surface area of the positive electrode active material to fall within the aforementioned range, the battery resistance of the lithium secondary battery (i.e., resistance to diffusion of lithium ions and electrons) at low temperatures can be reduced. For further enhancing the effects of the present invention, the BET specific surface area of the lithium-containing composite metal oxide is preferably 0.3 m$^2$/g or more, more preferably 0.5 m$^2$/g or more. Further, from the viewpoint of filling property, the BET specific surface area is preferably 1.8 m$^2$/g or less, and more preferably 1.5 m$^2$/g or less.

The upper limit values and lower limit values of the BET specific surface area can be arbitrarily combined.

In the positive electrode active material of the present embodiment, it is preferable that a value obtained by formula ($\alpha/\beta$)/1000 is 0.5 to 2.3, wherein $\alpha$ denotes a crystallite size (Å) in a powder X-ray diffraction measurement using CuK$\alpha$ radiation and $\beta$ denotes a BET specific surface area (m$^2$/g). By the aforementioned features, the cycle characteristics as well as the discharge capacity of the lithium secondary battery can be improved. For further enhancing the aforementioned effects, the value of ($\alpha/\beta$)/1000 is preferably 0.6 to 2.1, more preferably 0.7 to 2.1, still more preferably 0.7 to 1.9, and further more preferably 0.8 to 1.9.

(Residual Alkali)

With respect to the positive electrode active material of the present embodiment, the lithium carbonate content in a residual alkali on the particle surfaces thereof measured by neutralization titration is 0.1% by mass to 0.8% by mass. For obtaining a lithium secondary battery with higher cycle performance, the lithium carbonate content is preferably 0.2% by mass or more, and more preferably 0.3% by mass or more. Further, for suppressing the expansion of the battery during the charge/discharge cycle, the lithium carbonate content in a residual alkali on the particle surfaces thereof measured by neutralization titration is preferably 0.78% by mass or less, and more preferably 0.77% by mass or less.

In the positive electrode active material of the present embodiment, for obtaining a lithium secondary battery with higher cycle performance, the total content of lithium carbonate and lithium hydroxide in a residual alkali on particle surfaces as measured by neutralization titration is preferably 0.2% by mass or more, more preferably 0.25% by mass or more, and still more preferably 0.3% by mass or more. Further, for improving the stability of an electrode paste described below, the total content of lithium carbonate and lithium hydroxide in a residual alkali on particle surfaces as measured by neutralization titration is preferably 1.5 by mass or less, more preferably 1.4 by mass or less, and still more preferably 1.3 by mass or less.

The upper limit values and lower limit values of the total content of lithium carbonate and lithium hydroxide can be arbitrarily combined.

(Powder Conductivity)

In the positive electrode active material of the present embodiment, for improving the discharge capacity at high current rate, the powder conductivity under pressure of 6.37 kN/cm$^2$ is preferably 1×10$^{-3}$ S/cm or more, and more preferably 5×10$^{-3}$ S/cm or more. For obtaining a lithium secondary battery with higher cycle performance, the powder conductivity is preferably 1×10$^{-1}$ S/cm or less, and more preferably 8×10$^{-2}$ S/cm or less.

The upper limit values and lower limit values of the powder conductivity under pressure of 6.37 kN/cm$^2$ can be arbitrarily combined.

The positive electrode active material of the present invention for a lithium secondary battery has high cycle performance and high discharge capacity. The reason therefor is presumed to be as follows.

In the present invention, the lithium-containing composite metal oxide has a specific particle size which increases the surface area and increases the contact area between particles, which is considered to result in suppression of resistance and enable the positive electrode active material to exhibit high discharge capacity.

Further, in the present invention, the increased BET specific surface area results in formation of voids inside the particles, which are considered to alleviate the concentration of stress at boundaries between the primary particles due to the volume change during charge and discharge, thereby improving cycle performance. Furthermore, the reduced crystallite size is considered to make it possible to reduce the volume change during charge and discharge, which results in improved cycle characteristics.

[Method for Producing Lithium-Containing Composite Metal Oxide]

In producing the lithium-containing composite metal oxide of the present invention, it is preferred that a metal composite compound which includes essential metals other than lithium, i.e., Ni, Co and Mn, and at least one optional metal selected from Mg, Al and Zr is first prepared, and then the metal composite compound is baked with a suitable lithium salt. As the metal composite compound, it is preferable to use a metal composite hydroxide or a metal composite oxide. Hereinbelow, as to one example of the method for producing the positive electrode active material, explanations are made separately on the step of producing the metal composite compound and the step of producing the lithium-containing composite metal oxide.

(Step of Producing Metal Composite Compound)

The metal composite compound can be produced by the conventionally known batch method or co-precipitation method. Hereinbelow, the method for producing the metal composite compound is explained taking as an example the case of production of a metal composite hydroxide containing nickel, cobalt and manganese as metals.

First, a nickel salt solution, a cobalt salt solution, a manganese salt solution and a complexing agent are reacted by the co-precipitation method, especially, a continuous method described in Japanese Patent Unexamined Publication No. 2002-201028 to produce a metal composite hydroxide represented by Ni$_s$Co$_t$Mn$_u$(OH)$_2$, wherein s+t+u=1.

There is no particular limitation with respect to a nickel salt as a solute in the aforementioned nickel salt solution. For example, any of nickel sulfate, nickel nitrate, nickel chloride and nickel acetate can be used. As a cobalt salt as a solute in the cobalt salt solution, for example, any of cobalt sulfate, cobalt nitrate and cobalt chloride can be used. As a manganese salt as a solute in the manganese salt solution, for example, any of manganese sulfate, manganese nitrate and manganese chloride can be used. These metal salts are used in a ratio corresponding to the composition ratio of the aforementioned Ni$_s$Co$_t$Mn$_u$(OH)$_2$. As a solvent, water can be used.

The complexing agent is a substance capable of forming a complex with ions of nickel, cobalt and manganese in an aqueous solution, the examples of which include an ammonium ion donor (ammonium sulfate, ammonium chloride, ammonium carbonate, ammonium fluoride, etc.), hydrazine, ethylenediaminetetraacetic acid, nitrilotriacetic acid, uracil diacetate and glycine.

For adjusting the pH value of the aqueous solution during the precipitation, if necessary, an alkali metal hydroxide (such as sodium hydroxide or potassium hydroxide) may be added.

Successive addition of the aforementioned nickel salt solution, cobalt salt solution and manganese salt solution as well as the complexing agent to a reaction vessel allows nickel, cobalt and manganese to react with each other, resulting in the generation of $Ni_sCo_tMn_u(OH)_2$. The reaction is performed with the temperature in the reaction vessel being regulated, for example, within the range of 10° C. to 60° C., preferably 20° C. to 60° C. and the pH value in the reaction vessel being regulated, for example, within the range of 9 to 13, preferably 11 to 13, while appropriately agitating the content of the reaction vessel. With respect to the reaction vessel, one which allows the overflow for separation of the precipitated reaction product can be used.

After the reaction as described above, the resulting precipitate of the reaction product is washed with water and, then, dried, followed by isolation of a nickel-cobalt-manganese composite hydroxide as the nickel-cobalt-manganese composite compound. If necessary, the resulting may be washed with weak acid water. In the above example, a nickel-cobalt-manganese composite hydroxide is produced; however, a nickel-cobalt-manganese composite oxide may be produced instead.

With respect to various properties of the lithium-containing composite metal oxide to be finally obtained as a result of carrying out the process as described below, i.e., primary particle diameter, secondary particle diameter, crystallite size, and BET specific surface area, such properties can be adjusted by appropriately controlling the concentrations of the metal salts to be supplied to the reaction vessel, agitation speed, reaction temperature, reaction pH, and calcination conditions described below, and the like. Further, for realizing a desired particle morphology, a bubbling with various gases such as inert gases (e.g., nitrogen, argon and carbon dioxide), air and oxygen may be carried out as well in addition to the control of the aforementioned conditions. The reaction conditions can be optimized while monitoring the various physical properties of the final lithium-containing composite metal oxide to be obtained since the optimal reaction conditions may vary depending on the size of the reaction vessel used, etc.

(Step of Producing Lithium-Containing Composite Metal Oxide)

After drying the metal composite oxide or the metal composite hydroxide, the dried product is mixed with a lithium salt. The drying conditions are not particularly limited, and may be, for example, conditions under which the metal composite oxide or the metal composite hydroxide is not oxidized nor reduced (oxides→oxides, hydroxides→hydroxide), conditions under which the metal composite hydroxide is oxidized (hydroxide→oxide), and conditions under which the metal composite oxide is reduced (oxides→hydroxide). For providing conditions which neither cause oxidation nor reduction, it is possible to use an inert gas such as nitrogen or a noble gas (e.g., helium and argon). For conditions which oxidize the metal composite hydroxide, the drying may be carried out in an atmosphere of oxygen or air. Further, for providing conditions which reduce the metal composite oxide, a reducing agent such as hydrazine or sodium sulfite may be used in an inert gas atmosphere. As the lithium salt, any of lithium carbonate, lithium nitrate, lithium acetate, lithium hydroxide, lithium hydroxide hydrate and lithium oxide may be used individually or in the form of a mixture of two or more of these lithium salts.

After drying the metal composite oxide or the metal composite hydroxide, the resulting may be subjected to appropriate classification. The aforementioned lithium salt and the metal composite hydroxide are used in respective amounts determined in view of the composition ratio of the end product. For example, when using a nickel-cobalt-manganese composite hydroxide, the lithium salt and the metal composite hydroxide are used in a ratio corresponding to the composition ratio of $LiNi_sCo_tMn_uO_2$ (wherein s+t+u=1). By calcining a mixture of the nickel-cobalt-manganese composite hydroxide and the lithium salts, a lithium-nickel-cobalt-manganese composite oxide can be obtained. The calcination may be carried out in dried air, an oxygen atmosphere, an inert atmosphere or the like depending on the desired composition, and may include a plurality of heating steps if necessary.

The temperature for calcination of the aforementioned metal composite oxide or metal composite hydroxide and lithium compounds such as lithium hydroxide or lithium carbonate is not particularly limited, but is preferably 800° C. to 1,100° C., more preferably 810° C. to 1,000° C., and most preferably 820° C. to 900° C. When the calcination temperature is below 800° C., it is likely to cause a drawback that an energy density (discharge capacity) and a high rate discharge performance decrease. This may be attributable to a structural factor disturbing the movement of Li, which is inherently caused by the calcination at a temperature below the temperature region.

On the other hand, a calcination temperature exceeding 1,100° C. is likely to cause problems related to production process such as difficulty in obtaining a composite oxide having a desired composition due to volatilization of Li and a problem of deterioration of the battery performance due to increased density of the particles. This is due to the fact that, at a temperature above 1,100° C. a primary particle growth rate increases and a crystal particle of the composite oxide becomes too large, in addition, another cause of the problem is considered to reside in that the quantity of Li loss locally increases to cause the structural unstability.

Furthermore, as the temperature becomes higher, an elemental substitution between sites occupied by a Li element and sites occupied by transition metal elements occurs to an extremely high extent, and the discharge capacity decreases due to inhibition of Li conduction path. With the calcination temperature being in a range of 820° C. to 900° C., a battery having a particularly high energy density (discharge capacity) and an improved charge/discharge cycle performance can be manufactured. The calcination time is preferably 5 hours to 50 hours. The calcination time exceeding 50 hours tends to result in substantially lower battery performance due to volatilization of Li. The calcination time less than 5 hours tends to result in a poor crystal growth and an inferior battery performance. It is also effective to perform a precalcination in advance of the aforementioned calcination. Such a precalcination is preferably performed at a temperature in the range of 300 to 800° C. for 1 to 10 hours. The total calcination time may possibly be shortened by carrying out the precalcination.

The lithium-containing composite metal oxide after the calcination is pulverized and then appropriately classified, thereby obtaining the positive electrode active material applicable to a lithium secondary battery.

[Lithium Secondary Battery]

Next, a positive electrode using the aforementioned lithium-containing composite metal oxide of the present embodiment as a positive electrode active material for a lithium secondary battery, and a lithium secondary battery including the positive electrode will be described while explaining the construction of the lithium secondary battery.

An example of the lithium secondary battery of the present embodiment includes a positive electrode, a negative electrode, a separator sandwiched between the positive electrode and the negative electrode, and an electrolytic solution disposed between the positive electrode and the negative electrode.

Figure 1A:
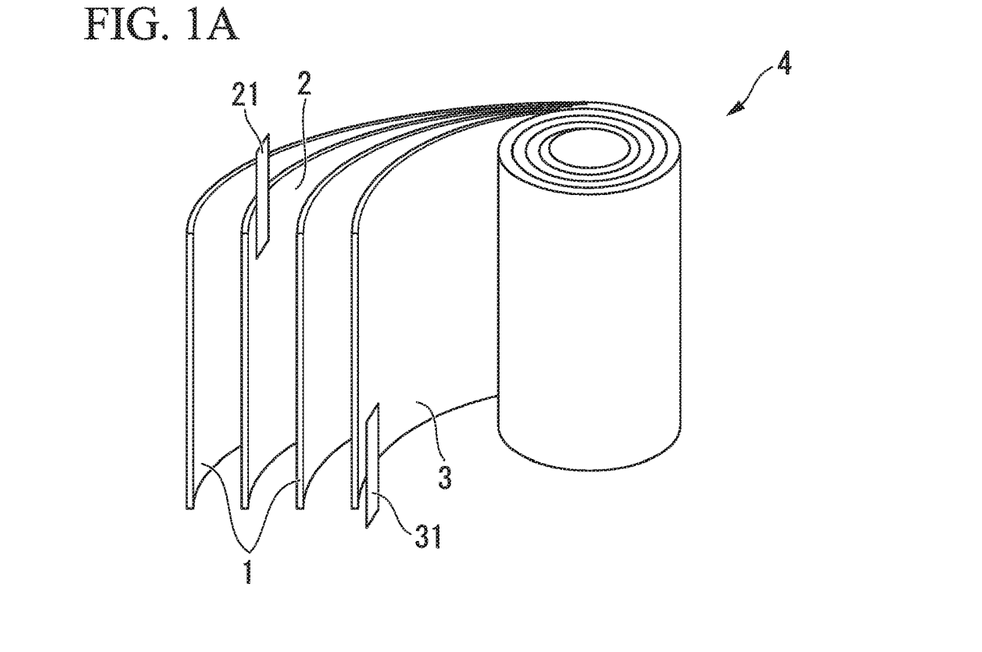
FIG. 1A is a schematic view showing one example of an electrode assembly to be used in a lithium secondary battery.
Figure 1B:
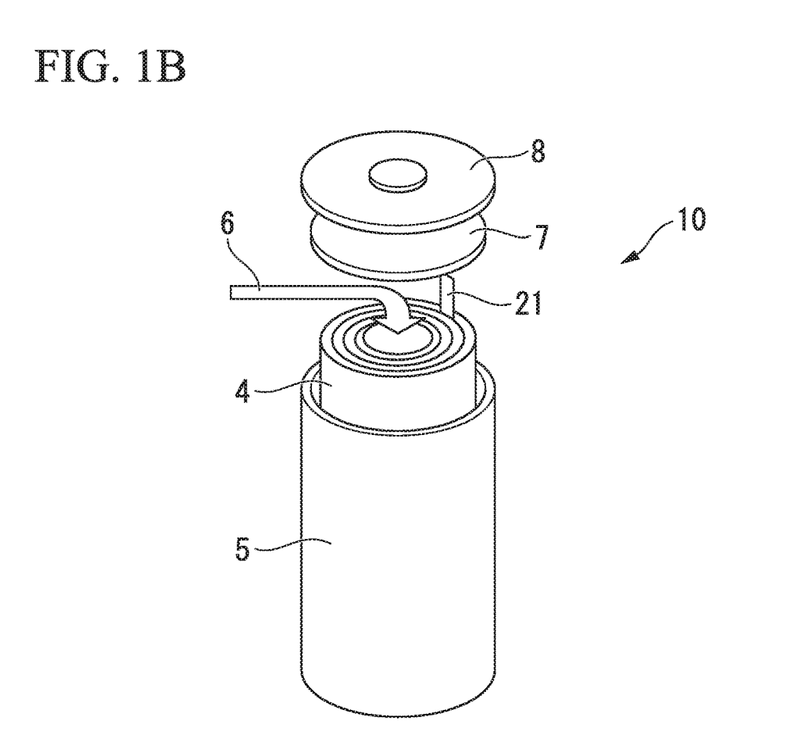
FIG. 1B is a schematic view showing one example of the lithium secondary battery using the electrode assembly shown in FIG. 1A.

Each of FIG. 1A and FIG. 1B is a schematic view illustrating an example of the electrode group used in the lithium secondary battery of the present embodiment, and the lithium secondary battery using the same. A cylindrical lithium secondary battery 10 of the present embodiment is manufactured as described below.

First, as illustrated in FIG. 1A, a pair of separators 1 having a strip shape, a strip-shaped positive electrode 2 having a positive electrode lead 21 at one end, and a strip-shaped negative electrode 3 having a negative electrode lead 31 at one end are laminated in an order of the separator 1, the positive electrode 2, the separator 1, and the negative electrode 3, and are wound to obtain an electrode group 4.

Next, as illustrated in FIG. 1B, the electrode group 4 and an insulator (not shown) are put in a battery can 5, then, the bottom of the can is sealed, an electrolytic solution 6 is impregnated into the electrode group 4, and an electrolyte is disposed between the positive electrode 2 and the negative electrode 3. Furthermore, the top section of the battery can 5 is sealed using a top insulator 7 and a sealing body 8, whereby the lithium secondary battery 10 can be obtained.

The shape of the electrode group 4 may be, for example, of a columnar shape with its cross-section being round, oval, rectangular, or of a round-cornered rectangular shape, wherein the cross-section is perpendicular to the axis of winding of the electrode group 4.

As the shape of the lithium secondary battery including the aforementioned electrode group 4, it is possible to employ the shapes prescribed by IEC60086, which is the standard of batteries prescribed by the International Electrotechnical Commission (IEC), or JIS C 8500. Examples thereof include a cylindrical shape, an angular shape, etc.

The lithium secondary battery is not limited to the wound construction as described above, and may have a laminated construction obtained by laminating a positive electrode, a separator, a negative electrode, a separator, and so forth. Examples of the laminated lithium secondary battery include the so-called coin-type battery, button-type battery, and paper-type (or sheet-type) battery.

Hereinafter, the respective components will be described.
(Positive Electrode)

The positive electrode of the present embodiment can be manufactured by, first, preparing a positive electrode mix including the aforementioned positive electrode active material, a conductive material and a binder, and causing the positive electrode mix to be supported on a positive electrode current collector.
(Conductive Material)

As the conductive material included in the positive electrode active material of the present embodiment, a carbonaceous material can be used. Examples of the carbonaceous material include carbon black (such as acetylene black) and a fibrous carbonaceous material. Since carbon black is a microparticle and has a large surface area, the addition of only a small amount of the carbon black to the positive electrode mix increases the conductivity within the positive electrode, and improves the charge and discharge efficiency and the output performance as well: however, too large an amount of carbon black deteriorates the binding strength of the binder exerted not only between the positive electrode mix and the positive electrode current collector but also within the positive electrode mix, resulting in an adverse factor that increases an internal resistance.

The amount of the conductive material in the positive electrode mix is preferably from 5 parts by mass to 20 parts by mass, relative to 100 parts by mass of the positive electrode active material for a lithium secondary battery. This amount may be decreased when using a fibrous carbonaceous material such as a graphitized carbon fiber or a carbon nanotube as the conductive material.
(Binder)

As the binder included in the positive electrode active material of the present embodiment, a thermoplastic resin can be used.

Examples of the thermoplastic resin include fluororesins such as polyvinylidene fluoride (hereinafter, in some cases, referred to as PVdF), polytetrafluoroethylene (hereinafter, in some cases, referred to as PTFE), ethylene tetrafluoride-propylene hexafluoride-vinylidene fluoride type copolymers, propylene hexafluoride-vinylidene fluoride type copolymers, and ethylene tetrafluoride-perfluorovinyl ether type copolymers; and polyolefin resins such as polyethylene and polypropylene.

Two or more of these thermoplastic resins may be used in a mixture thereof. For example, when a fluororesin and a polyolefin resin are used as the binder, it is possible to obtain a positive electrode mix capable of strong adhesive force relative to the positive electrode current collector as well as strong biding force within the positive electrode mix in itself by adjusting the ratio of the fluororesin to fall within the range of from 1% by mass to 10% by mass, and the ratio of the polyolefin resin to fall within the range of from 0.1% by mass to 2% by mass, based on the total mass of the positive electrode mix.
(Positive Electrode Current Collector)

As the positive electrode current collector included in the positive electrode active material of the present embodiment, it is possible to use a strip-shaped member composed of a metal material such as Al, Ni, or stainless steel as a component material. It is especially preferred to use a current collector which is made of Al and is shaped into a thin film because of its low cost.

Examples of the method for causing the positive electrode mix to be supported on the positive electrode current collector include a method in which the positive electrode mix is press-formed on the positive electrode current collector. Alternatively, the positive electrode mix may be caused to be supported on the positive electrode current collector by a method including producing a paste from the positive electrode mix using an organic solvent, applying the obtained paste of the positive electrode mix to at least one surface of the positive electrode current collector, drying the paste, and press-bonding the resultant to the current collector.

Examples of the organic solvent that can be used for producing the paste from the positive electrode mix include amine-based solvents such as N,N-dimethylaminopropylamine and diethylene triamine; ether-based solvents such as tetrahydrofuran; ketone-based solvents such as methyl ethyl ketone; ester-based solvents such as methyl acetate; and amide-based solvents such as dimethyl acetamide, and N-methyl-2-pyrrolidone (hereinafter, sometimes also referred to as "NMP").

Examples of the method for applying the paste of the positive electrode mix to the positive electrode current collector include a slit die coating method, a screen coating method, a curtain coating method, a knife coating method, a gravure coating method, and an electrostatic spray method.

The positive electrode can be produced by the method as described above.

(Negative Electrode)

The negative electrode included in the lithium secondary battery of the present embodiment is not particularly limited as long as it is capable of doping and de-doping lithium ions at a potential lower than the positive electrode, and examples thereof include an electrode comprising a negative electrode current collector having supported thereon a negative electrode mix including a negative electrode active material, and an electrode constituted solely of a negative electrode active material.

(Negative Electrode Active Material)

Examples of the negative electrode active material included in the negative electrode include materials which are carbonaceous materials, chalcogen compounds (oxides, sulfides, etc.), nitrides, metals or alloys, and allow lithium ions to be doped or de-doped at a potential lower than the positive electrode.

Examples of the carbonaceous materials that can be used as the negative electrode active material include graphite such as natural graphite and artificial graphite, cokes, carbon black, pyrolytic carbons, carbon fibers, and organic macromolecular compound-sintered bodies.

Examples of oxides that can be used as the negative electrode active material include oxides of silicon represented by the formula: $SiO_x$ (wherein x is an positive integer) such as $SiO_2$ and SiO; oxides of titanium represented by the formula: $TiO_x$ (wherein x is an positive integer) such as $TiO_2$ and TiO; oxides of vanadium represented by the formula: $VO_x$ (wherein x is an positive integer) such as $V_2O_5$ and $VO_2$; oxides of iron represented by the formula: $FeO_x$ (wherein x is an positive integer) such as $Fe_3O_4$, $Fe_2O_3$ and FeO; oxides of tin represented by the formula: $SnO_x$ (wherein x is an positive integer) such as $SnO_2$ and SnO; oxides of tungsten represented by the formula: $WO_x$ (wherein x is an positive integer) such as $WO_3$ and $WO_2$; and metal composite oxides containing lithium and titanium or vanadium such as $Li_4Ti_5O_{12}$ and $LiVO_2$.

Examples of sulfides that can be used as the negative electrode active material include sulfides of titanium represented by the formula: $TiS_x$ (wherein x is an positive integer) such as $Ti_2S_3$, $TiS_2$ and TiS; sulfides of vanadium represented by the formula: $VS_x$ (wherein x is an positive integer) such as $V_3S_4$ and $VS_2$, V; sulfides of iron represented by the formula: $FeS_x$ (wherein x is an positive integer) such as $Fe_3S_4$, $FeS_2$ and FeS; sulfides of molybdenum represented by the formula: $MoS_x$ (wherein x is an positive integer) such as $Mo_2S_3$ and $MoS_2$; sulfides of tin represented by the formula: $SnS_x$ (wherein x is an positive integer) such as $SnS_2$ and SnS; sulfides of tungsten represented by the formula: WS, (wherein x is an positive integer) such as $WS_2$; sulfides of antimony represented by the formula: $SbS_x$ (wherein x is an positive integer) such as $Sb_2S_3$; and sulfides of selenium represented by the formula: $SeS_x$ (wherein x is an positive integer) such as $Se_5S_3$, $SeS_2$ and SeS.

Examples of nitrides that can be used as the negative electrode active material include lithium-containing nitrides such as $Li_3N$ and $Li_{3-x}A_xN$ (wherein A is one or both of Ni and Co, and $0<x<3$).

Each of the aforementioned carbonaceous materials, oxides, sulfides and nitrides may be used alone or in combination. Further, each of the aforementioned carbonaceous materials, oxides, sulfides and nitrides may be crystalline or amorphous.

Examples of metals that can be used as the negative electrode active material include lithium metals, silicon metals, tin metals, etc.

Examples of alloys that can be used as the negative electrode active material include lithium alloys such as Li—Al, Li—Ni, Li—Si, Li—Sn, and Li—Sn—Ni; silicon alloys such as Si—Zn; tin alloys such as Sn—Mn, Sn—Co, Sn—Ni, Sn—Cu, and Sn—La; and alloys such as $Cu_2Sb$ and $La_3Ni_2Sn_7$.

The metals or alloys are processed into, for example, a foil, and are in many cases used alone as an electrode.

Among the aforementioned negative electrode materials, carbonaceous materials composed mainly of graphite such as natural graphite or artificial graphite are preferably used for the following reasons: the potential of the negative electrode hardly changes during charging from a uncharged state to a fully charged state (the potential flatness is favorable), the average discharge potential is lower, the capacity maintenance ratio after repeated charge/discharge cycles is higher (the cycle performance is favorable), etc. Examples of the shape of the carbonaceous material include a flake shape as in the case of natural graphite, a spherical shape as in the case of mesocarbon microbeads, a fibrous shape as in the case of a graphitized carbon fiber, an agglomerate of fine powder, etc., and the carbonaceous material may have any of these shapes.

The negative electrode mix may include a binder as necessary. As the binder, a thermoplastic resin can be used, and specific examples thereof include PVdF, thermoplastic polyimides, carboxymethyl cellulose, polyethylene, and polypropylene.

(Negative Electrode Current Collector)

Examples of the negative electrode current collector included in the negative electrode include a strip-shaped member composed of a metal material such as Cu, Ni or stainless steel as a component material. Among these, it is preferred to use a current collector which is made of Cu and is shaped into a thin film, since Cu is unlikely to form an alloy with lithium and can be easily processed.

Examples of the method for causing the negative electrode mix to be supported on the above-described negative electrode current collector include, as in the case of the positive electrode, a press forming method, and a method in which a paste of the negative electrode mix obtained by using a solvent etc., is applied to and dried on the negative electrode current collector, and the resulting is press bonded to the current collector.

(Separator)

As the separator used in the lithium secondary battery of the present embodiment, for example, it is possible to use one that is formed of a material such as a polyolefin resin (e.g., polyethylene or polypropylene), a fluororesin or a nitrogen-containing aromatic polymer, and has a form of a porous film, a nonwoven fabric, a woven fabric or the like. The separator may be composed of two or more of the materials as mentioned above, or may be formed by laminating these materials.

In the present embodiment, for satisfactory permeation of the electrolyte through the separator during the use (charge and discharge) of the battery, the separator preferably has an air resistance of 50 sec/100 cc to 300 sec/100 cc, more preferably 50 sec/100 cc to 200 sec: 00 cc as measured by Gurley method prescribed in JIS P 8117.

The porosity of the separator is preferably 30% by volume to 80% by volume, and more preferably 40% by volume to 70% by volume. The separator may be a laminate of separators having different porosities.

(Electrolytic Solution)

The electrolytic solution used in the lithium secondary battery of the present embodiment contains an electrolyte and an organic solvent.

Examples of the electrolyte contained in the electrolytic solution include lithium salts such as $LiClO_4$, $LiPF_6$, $LiAsF_6$, $LiSbF_6$, $LiBF_4$, $LiCF_3SO_3$, $LiN(SO_2CF_3)_2$, $LiN(SO_2C_2F_5)_2$, $LiN(SO_2CF_3)(COCF_3)$, $Li(C_4F_9SO_3)$, $LiC(SO_2CF_3)_3$, $Li_2B_{10}Cl_{10}$, LiBOB (wherein "BOB" means bis(oxalato)borate), LiFSI (wherein FSI means bis(fluorosulfonyl)imide), a lithium salt of a lower aliphatic carboxylic acid, and $LiAlCl_4$. Two or more of these salts may be used in the form of a mixture thereof. Among these electrolytes, it is preferred to use at least one fluorine-containing salt selected from the group consisting of $LiPF_6$, $LiAsF_6$, $LiSbF_6$, $LiBF_4$, $LiCF_3SO_3$, $LiN(SO_2CF_3)_2$, and $LiC(SO_2CF_3)_3$.

As the organic solvent included in the electrolyte, it is possible to use, for example, a carbonate such as propylene carbonate, ethylene carbonate, dimethyl carbonate, diethyl carbonate, ethyl methyl carbonate, 4-trifluoromethyl-1, 3-dioxolane-2-one, and 1,2-di(methoxycarbonyloxy)ethane: an ether such as 1,2-dimethoxyethane, 1,3-dimethoxypropane, pentafluoropropyl methyl ether, 2,2,3,3-tetrafluoropropyl difluoromethyl ether, tetrahydrofuran, and 2-methyl tetrahydrofuran; an ester such as methyl formate, methyl acetate, and y-butyrolactone: a nitrile such as acetonitrile and butyronitrile; an amide such as N,N-dimethyl formamide and N,N-dimethylacetoamide; a carbamate such as 3-methyl-2-oxazolidone: a sulfur-containing compound such as sulfolane, dimethyl sulfoxide, and 1,3-propane sultone; or a solvent produced by further introducing a fluoro group into the above-described organic solvent (a solvent in which one or more hydrogen atoms included in the organic solvent is substituted by a fluorine atom).

As the organic solvent, it is preferable to use a mixture of two or more of these organic solvents. Among the aforementioned organic solvents, a solvent mixture including a carbonate is preferable, and a solvent mixture of a cyclic carbonate and a non-cyclic carbonate and a solvent mixture of a cyclic carbonate and ether are more preferable. As the solvent mixture of a cyclic carbonate and a non-cyclic carbonate, a solvent mixture including ethylene carbonate, dimethyl carbonate, and ethyl methyl carbonate is preferable. An electrolytic solution using the aforementioned solvent mixture has many advantages such as a wider operational temperature range, a low tendency of deterioration even after charge/discharge at a high current rate, a low tendency of deterioration even when used for a long period of time, and a low decomposability even when a graphite material such as natural graphite or artificial graphite is used as the active material for the negative electrode.

For improving the stability of the obtained lithium secondary battery, it is preferable to use an electrolytic solution including a lithium salt containing fluorine such as $LiPF_6$ and an organic solvent having a fluorine substituent. A solvent mixture including ether having a fluorine substituent such as pentafluoropropyl methyl ether or 2,2,3,3-tetrafluoropropyl difluoromethyl ether and dimethyl carbonate is more preferable since a high capacity maintenance ratio is achievable even when the battery is charged and discharged at a high current rate.

A solid electrolyte may be used instead of the aforementioned electrolytic solution. As the solid electrolyte, it is possible to use, for example, an organic polymer electrolyte such as a polyethylene oxide-type polymeric compound or a polymeric compound including at least one type of polymer chain selected from a polyorganosiloxane chain or a polyoxyalkylene chain. It is also possible to use the so-called gel-type electrolyte including a polymer retaining therein a non-aqueous electrolytic solution. Further, it is also possible to use an inorganic solid electrolyte including a sulfide such as $Li_2S$—$SiS_2$, $Li_2S$—$GeS_2$, $Li_2S$—$P_2S_5$, $Li_2S$—$B_2S_3$, $Li_2S$—$SiS_2$—$Li_3PO_4$, $Li_2S$—$SiS_2$—$Li_2SO_4$, and $Li_2S$—$GeS_2$—$P_2S_5$. In some cases, the use of such a solid electrolyte may further improve the safety of the lithium secondary battery.

In the lithium secondary battery of the present embodiment, the solid electrolyte, when used, serves as a separator. In such a case, the separator may be omitted.

The positive electrode active material having features as described above uses the lithium-containing composite metal oxide of the present embodiment as described above, whereby the positive electrode active material can enable a lithium ion battery using the positive electrode active material to exhibit higher cycle performance and higher discharge capacity than the conventional lithium secondary batteries.

Further, the positive electrode having features as described above contains the positive electrode active material using the lithium-containing composite metal oxide of the present embodiment as described above, whereby the positive electrode can enable a lithium ion battery using the positive electrode to exhibit higher cycle performance and higher discharge capacity than the conventional lithium secondary batteries.

Furthermore, the lithium secondary battery having features as described above has the aforementioned positive electrode, and hence is capable of higher cycle performance and higher discharge capacity than the conventional lithium secondary batteries.

EXAMPLES

Hereinbelow: the present invention will be described in more detail with reference to the Examples.

In the Examples, the evaluation of a lithium-containing composite metal oxide (positive electrode active material) and the evaluation of the manufacturing of a positive electrode and a lithium secondary battery were performed as follows.

(1) Evaluation of Positive Electrode Active Material for Lithium Secondary Battery 1. Composition Analysis of Positive Electrode Active Material for Lithium Secondary Battery The composition analysis of the lithium-containing composite metal oxide manufactured by the method described below was carried out using an inductively coupled plasma emission spectrometer (SPS3000, manufactured by SII Nano Technology Inc.) after a sample powder of the lithium-containing composite metal oxide was dissolved in hydrochloric acid.

2. Measurement of Primary Particle Diameter of Positive Electrode Active Material for Lithium Secondary Battery First, a sample powder of lithium-containing composite metal oxide was placed on a conductive sheet attached onto a sample stage, and SEM observation was carried out by radiating an electron beam with an accelerated voltage of 20 kV using a JSM-5510 manufactured by JEOL Ltd. 50 primary particles were arbitrarily selected in an image (SEM photograph) obtained from the SEM observation, parallel lines were drawn from a certain direction so as to sandwich the projection image of each primary particle, and the distance between the parallel lines was measured as the particle diameter of the primary particle. The arithmetic average value of the obtained particle diameters is regarded as the average primary particle diameter of the lithium-containing composite metal oxide.

3. Measurement of Cumulative Particle Size of Positive Electrode Active Material for Lithium Secondary Battery First, 0.1 g of a powder of the lithium-containing composite metal oxide was added to 50 ml of 0.2 wt % aqueous solution of sodium hexametaphosphate, thereby obtaining a dispersion with the powder dispersed therein. The obtained dispersion was subjected to a particle size distribution measurement using a laser scattering particle size distribution measuring apparatus (Mastersizer 2000, manufactured by Malvern Instruments Ltd.), whereby the volume-based particle size distribution was measured. From the obtained cumulative particle size distribution curve, the particle sizes at 10% cumulation, 50% cumulation and 90% cumulation measured from the smallest particle side were determined as $D_{10}$, $D_{50}$ and $D_{90}$, respectively.

4. Measurement of Crystallite Size of Positive Electrode Active Material for Lithium Secondary Battery The powder X-ray diffraction analysis of the lithium-containing composite metal oxide was carried out using an X-ray diffractometer (X'Pert PRO, manufactured by PANalytical). The obtained lithium-containing composite metal oxide was charged onto a specifically designed substrate, and the measurement was carried out using a Cu-Kα radiation source with a diffraction angle in the range of 2θ=10° to 90°, thereby obtaining a powder X-ray diffraction pattern. From the X-ray powder diffraction pattern, the half width value of the peak corresponding to the peak A and the half width value of the peak corresponding to the peak B were determined using a comprehensive X-ray powder diffraction pattern analyzing software JADE5, from which the crystallite size was calculated by the Scherrer equation.

5. Measurement of BET Specific Surface Area of Positive Electrode Active Material for Lithium Secondary Battery The BET specific surface area was measured using a FLOWSORB II2300 manufactured by Micromeritics Instrument Corporation after 1 g of the sample powder of lithium-containing composite metal oxide was dried at 150° C. in a nitrogen atmosphere for 15 minutes.

6. Determination of Residual Alkali Content of Positive Electrode Active Material for Lithium Secondary Battery 20 g of the lithium-containing composite metal oxide and 100 g of pure water were placed in 100-mL beaker, and stirred for 5 minutes. Then, the lithium-containing composite metal oxide was filtered. To 60 g of the remaining filtrate was dropwise added hydrochloric acid in an amount of 0.1 mol/L, and the pH of the filtrate was measured by a pH meter. The concentrations of the lithium hydroxide and the lithium carbonate remaining in the lithium-containing composite metal oxide were calculated by the following formula, wherein A mL represents the titer of hydrochloric acid at pH=8.3±0.1 and B mL represents the titer of hydrochloric acid at pH=4.5±0.1.

$$\text{Lithium hydroxide concentration (\%)}=0.1\times(2A-B)/1000\times23.941/(20\times60/100)\times100$$

$$\text{Lithium carbonate concentration (\%)}=0.1\times(B-A)/1000\times73.882/(20\times60/100)\times100$$

7. Measurement of Powder Conductivity

The measurement of powder conductivity was carried out using MCP-PD 51 manufactured by Mitsubishi Chemical Analytech Co., Ltd. under the following conditions.

Lithium-containing composite metal oxide content: 4.0 g
Stage diameter: 20 mm
Pressure: 20 kN (2) Production of Positive Electrode A lithium-containing composite metal oxide (positive electrode active material) obtained by a production method described below, a conductive material (acetylene black), and a binder (PVdF) were mixed and kneaded so as to obtain a composition of the positive electrode active material, the conductive material, and the binder at a mass ratio of 92:5:3, thereby preparing a paste-form positive electrode mix. During the preparation of the positive electrode mix, N-methyl-2-pyrrolidone was used as an organic solvent.

The obtained positive electrode mix was applied to a 40 μm-thick Al foil as a current collector, and was dried in a vacuum at 150° C. for eight hours, thereby obtaining a positive electrode. The electrode area of the positive electrode was set to 1.65 cm².

(3) Production of Lithium Secondary Battery (Coin-Type Battery)

The following operations were carried out in an argon atmosphere within a glove box.

The positive electrode produced in the "(2) Production of Positive Electrode" was placed on a bottom lid of a coin cell for a coin-type battery R2032 (manufactured by Hohsen Corporation) with the aluminum foil surface facing downward, and a laminate film separator (a separator including a heat-resistant porous layer laminated on a polyethylene porous film (thickness: 16 μm)) was placed on the positive electrode. 300 μl of an electrolytic solution was injected thereinto. The electrolytic solution used was prepared by dissolving vinylene carbonate and $LiPF_6$ to a mixture of ethylene carbonate, dimethyl carbonate and ethyl methyl carbonate with a volume ratio of 16:10:74 such that the amounts of vinylene carbonate and $LiPF_6$ became 1 vol % and 1.3 mol/L respectively.

Next, an artificial graphite (MAGD, manufactured by Hitachi Chemical Co., Ltd.) used as a negative electrode was placed on the laminate film separator, covered with a top lid through a gasket, and then swaged using a swage, thereby producing a lithium secondary battery (coin-type battery R2032, hereinafter, in some cases, referred to as "coin-type battery").

(4) Charge/Discharge Test

A charge/discharge test was carried out under conditions described below using the coin-type battery produced in the "(3) Production of Lithium Secondary Battery (Coin-type Battery)". In the activation treatment, the charge capacity and the discharge capacity were measured as follows.

<Activation of Negative Electrode>

Treatment temperature: 25° C.

Charge conditions: Maximum charge voltage 4.2 V, charge time 5 hours, and charge current 0.2 CA Discharge conditions: Minimum discharge voltage 2.7 V, discharge time 5 hours, and discharge current 0.2 CA <Cycle Test>

Using the coin-type battery subjected to the aforementioned charge/discharge test, a cycle test of 200 cycles was carried out to evaluate the battery life and the discharge capacity maintenance ratio after 200 cycles was calculated by the formula described below. The higher discharge capacity maintenance ratio after 200 cycles means longer battery life.

$$\text{Discharge capacity maintenance ratio after 200 cycles (\%)}=\text{discharge capacity at the 200th cycle}/\text{discharge capacity at the 1st cycle}\times100$$

<Conditions for Cycle Test>
Test temperature: 60° C.
Charge conditions: Maximum charge voltage 4.1 V, charge time 5 hours, and charge current 0.2 CA
Time of pause after charge: 10 minutes
Discharge conditions: Minimum discharge voltage 3.0 V, discharge time 0.5 hours, and discharge current 0.2 CA
Time of pause after discharge: 10 minutes
In this test, one cycle is a set of charge, pause of charge, discharge and pause of discharge which were performed in this order.

Example 1

1. Production of Lithium-Containing Composite Metal Oxide 1

Into a reaction vessel equipped with a stirrer and an overflow pipe was charged water, followed by addition of an aqueous sodium hydroxide solution. The temperature of the resulting liquid was maintained at 50° C.

An aqueous nickel sulfate solution, an aqueous cobalt sulfate solution and an aqueous manganese sulfate solution were mixed together such that the atomic ratio between nickel atoms, cobalt atoms and manganese atoms became 0.60:0.20:0.20, to thereby prepare a raw material mixture solution.

Then, the obtained raw material mixture solution and an aqueous ammonium sulfate solution as a complexing agent were continuously added to the reaction vessel with stirring, and an aqueous sodium hydroxide solution was dropwise added thereto at an appropriate timing such that the pH of the solution in the reaction vessel became 12.2, thereby obtaining nickel-cobalt-manganese composite hydroxide particles 1. The resulting particles were washed with water after filtration, and dried at 100° C., to thereby obtain a nickel-cobalt-manganese composite hydroxide 1 in the form of dry powder.

The BET specific surface area of the nickel-cobalt-manganese composite hydroxide 1 was 10.3 m$^2$/g.

The thus obtained dry powder of nickel-cobalt-manganese composite hydroxide 1 and a lithium carbonate powder were weighed such that Li/(Ni+Co+Mn)=1.05, followed by mixing. The resulting was calcined in ambient atmosphere at 760° C. for 5 hours, thereby obtaining a calcined product 1A. By calcining the calcined product 1A in oxygen atmosphere at 850° C. for 10 hours, a lithium-containing composite metal oxide 1 as an end product, i.e., lithium-nickel-cobalt-manganese composite oxide 1, was obtained.

2. Evaluation of Lithium-Containing Composite Metal Oxide

The results of the composition analysis of the lithium-containing composite metal oxide 1 revealed that the molar ratio of Li:Ni:Co:Mn was 1.05:0.61:0.20:0.19.

The primary particle diameter and the volume-based 50% cumulative particle size $D_{50}$ of the lithium-containing composite metal oxide 1 were respectively 0.28 μm and 6.4 μm. Further, the volume-based 10% cumulative particle size $D_{10}$ and the volume-based 90% cumulative particle size $D_{90}$ were respectively 3.2 μm and 12.4 μm, and the ratio (D90/D10) was 3.9.

The crystallite sizes calculated from peak A and peak B of the lithium-containing composite metal oxide 1 were respectively 700 Å and 425 Å.

The BET specific surface area of the lithium-containing composite metal oxide 1 was 0.60 m$^2$/g, and the value of [(α/β)/1000] was 1.17.

The amounts of lithium hydroxide and lithium carbonate remaining in the lithium-containing composite metal oxide 1 were respectively 0.17% by mass and 0.14% by mass.

The powder conductivity of the lithium-containing composite metal oxide 1 under pressure of 6.37 kN/cm$^2$ was 1.22×10$^{-2}$ S/cm.

3. Evaluation of Lithium Secondary Battery

A coin-type battery was produced using the positive electrode active material 1, and a cycle test was carried out. As a result, the discharge capacity at the 1st cycle, the discharge capacity at the 200th cycle and the discharge capacity maintenance ratio were respectively 151 mAh/g, 139 mAh/g and 92%.

Example 2

1. Production of Lithium-Containing Composite Metal Oxide 1

A nickel-cobalt-manganese composite hydroxide 2 was produced following the same procedure as in Example 1 except that an aqueous sodium hydroxide solution was dropwise added to the reaction vessel at an appropriate timing such that the pH of the solution in the reaction vessel became 12.4. The BET specific surface area of the nickel-cobalt-manganese composite hydroxide 2 was 39.9 m$^2$/g.

The thus obtained dry powder of nickel-cobalt-manganese composite hydroxide 2 and a lithium carbonate powder were weighed such that Li/(Ni+Co+Mn)=1.05, followed by mixing. The resulting was calcined in ambient atmosphere at 760° C. for 5 hours, thereby obtaining a calcined product 2A. By calcining the calcined product 2A in ambient atmosphere at 850° C. for 10 hours, a lithium-containing composite metal oxide 2 as an end product, i.e., lithium-nickel-cobalt-manganese composite oxide 2, was obtained.

2. Evaluation of Lithium-Containing Composite Metal Oxide 2

The results of the composition analysis of the lithium-containing composite metal oxide 2 revealed that the molar ratio of Li:Ni:Co:Mn was 1.08:0.60:0.20:0.20.

The primary particle diameter and the volume-based 50% cumulative particle size $D_{50}$ of the lithium-containing composite metal oxide 2 were respectively 0.42 μm and 5.5 μm. Further, the volume-based 10% cumulative particle size $D_{10}$ and the volume-based 90% cumulative particle size $D_{90}$ were respectively 2.4 μm and 13.2 μm, and the ratio (D90/D10) was 5.5.

The crystallite sizes calculated from peak A and peak B of the lithium-containing composite metal oxide 2 were respectively 857 Å and 520 Å.

The BET specific surface area of the lithium-containing composite metal oxide 2 was 1.00 m$^2$/g, and the value of [(α/β)/1000] was 0.86.

The amounts of lithium hydroxide and lithium carbonate remaining in the lithium-containing composite metal oxide 2 were respectively 0.30% by mass and 0.76% by mass.

The powder conductivity of the lithium-containing composite metal oxide 2 under pressure of 6.37 kN/cm$^2$ was 3.86×10$^{-3}$ S/cm.

3. Evaluation of Lithium Secondary Battery

A coin-type battery was produced using the positive electrode active material 2, and a cycle test was carried out. As a result, the discharge capacity at the 1st cycle, the discharge capacity at the 200th cycle and the discharge capacity maintenance ratio were respectively 150 mAh/g, 130 mAh/g and 87%.

Example 3

1. Production of Lithium-containing Composite Metal Oxide 3

By calcining the calcined product 2A obtained in Example 2 in oxygen atmosphere at 850° C. for 10 hours, a lithium-containing composite metal oxide 3 as an end product, i.e., lithium-nickel-cobalt-manganese composite oxide 3, was obtained.

2. Evaluation of Lithium-containing Composite Metal Oxide 3

The results of the composition analysis of the lithium-containing composite metal oxide 3 revealed that the molar ratio of Li:Ni:Co:Mn was 1.10:0.60:0.20:0.20.

The primary particle diameter and the volume-based 50% cumulative particle size $D_{50}$ of the lithium-containing composite metal oxide 3 were respectively 0.32 μm and 5.2 μm. Further, the volume-based 10% cumulative particle size $D_{10}$ and the volume-based 90% cumulative particle size $D_{90}$ were respectively 2.4 μm and 8.4 μm, and the ratio (D90/D10) was 3.5.

The crystallite sizes calculated from peak A and peak B of the lithium-containing composite metal oxide 3 were respectively 789 Å and 464 Å.

The BET specific surface area of the lithium-containing composite metal oxide 3 was 0.60 m²/g, and the value of $[(\alpha/\beta)/1000]$ was 1.32.

The amounts of lithium hydroxide and lithium carbonate remaining in the lithium-containing composite metal oxide 3 were respectively 0.40% by mass and 0.22% by mass.

The powder conductivity of the lithium-containing composite metal oxide 3 under pressure of 6.37 kN/cm² was $4.72 \times 10^{-3}$ S/cm.

3. Evaluation of Lithium Secondary Battery

A coin-type battery was produced using the positive electrode active material 3, and a cycle test was carried out. As a result, the discharge capacity at the 1st cycle, the discharge capacity at the 200th cycle and the discharge capacity maintenance ratio were respectively 154 mAh/g, 139 mAh/g and 90%.

Example 4

1. Production of Lithium-Containing Composite Metal Oxide 4

A nickel-cobalt-manganese composite hydroxide 3 was produced following the same procedure as in Example 1 except that the temperature of the solution in the reaction vessel was set at 45° C., and an aqueous sodium hydroxide solution was dropwise added to the reaction vessel at an appropriate timing such that the pH of the solution in the reaction vessel became 12.8. The BET specific surface area of the nickel-cobalt-manganese composite hydroxide 3 was 73.4 m²/g.

The thus obtained dry powder of nickel-cobalt-manganese composite hydroxide 3 and a lithium carbonate powder were weighed such that Li/(Ni+Co+Mn)=1.05, followed by mixing. The resulting was calcined in ambient atmosphere at 760° C. for 5 hours, thereby obtaining a calcined product 4A. By calcining the calcined product 4A in oxygen atmosphere at 850° C. for 10 hours, a lithium-containing composite metal oxide 4 as an end product, i.e., lithium-nickel-cobalt-manganese composite oxide 4, was obtained.

2. Evaluation of Lithium-Containing Composite Metal Oxide 4

The results of the composition analysis of the lithium-containing composite metal oxide 4 revealed that the molar ratio of Li:Ni:Co:Mn was 1.09:0.60:0.20:0.20 ℃.

The primary particle diameter and the volume-based 50% cumulative particle size $D_{50}$ of the lithium-containing composite metal oxide 4 were respectively 0.40 μm and 5.1 μm. Further, the volume-based 10% cumulative particle size $D_{10}$ and the volume-based 90% cumulative particle size $D_{90}$ were respectively 2.6 μm and 9.8 μm, and the ratio (D90/D10) was 3.8.

The crystallite sizes calculated from peak A and peak B of the lithium-containing composite metal oxide 4 were respectively 866 Å and 520 Å.

The BET specific surface area of the lithium-containing composite metal oxide 4 was 0.79 m²/g, and the value of $[(\alpha/\beta)/1000]$ was 1.10.

The amounts of lithium hydroxide and lithium carbonate remaining in the lithium-containing composite metal oxide 4 were respectively 0.47% by mass and 0.35% by mass.

The powder conductivity of the lithium-containing composite metal oxide 4 under pressure of 6.37 kN/cm² was $3.03 \times 10^{-3}$ S/cm.

3. Evaluation of Lithium Secondary Battery

A coin-type battery was produced using the positive electrode active material 4, and a cycle test was carried out. As a result, the discharge capacity at the 1st cycle, the discharge capacity at the 200th cycle and the discharge capacity maintenance ratio were respectively 153 mAh/g, 137 mAh/g and 90%.

Comparative Example 1

1. Production of Lithium-Containing Composite Metal Oxide 5

The dry powder of the nickel-cobalt-manganese composite hydroxide 1 obtained in Example 1 and a lithium carbonate powder were weighed such that Li/(Ni+Co+Mn)=1.05, followed by mixing. The resulting was calcined in ambient atmosphere at 850° C. for 10 hours, thereby obtaining a lithium-containing composite metal oxide 5 as an end product, i.e., lithium-nickel-cobalt-manganese composite oxide 5.

2. Evaluation of Lithium-Containing Composite Metal Oxide 5

The results of the composition analysis of the lithium-containing composite metal oxide 5 revealed that the molar ratio of Li:Ni:Mn:Co was 1.07:0.60:0.20:0.20.

The primary particle diameter and the volume-based 50% cumulative particle size $D_{50}$ of the lithium-containing composite metal oxide 5 were respectively 0.35 μm and 11.9 μm. Further, the volume-based 10% cumulative particle size $D_{10}$ and the volume-based 90% cumulative particle size $D_{90}$ were respectively 4.7 μm and 31.4 μm, and the ratio (D90/D10) was 6.7.

The crystallite sizes calculated from peak A and peak B of the lithium-containing composite metal oxide 5 were respectively 1,365 Å and 693 Å.

The BET specific surface area of the lithium-containing composite metal oxide 5 was 0.58 m²/g, and the value of $[(\alpha/\beta)/1000]$ was 2.35.

The amounts of lithium hydroxide and lithium carbonate remaining in the lithium-containing composite metal oxide 5 were respectively 0.17% by mass and 1.60% by mass.

The powder conductivity of the lithium-containing composite metal oxide 5 under pressure of 6.37 kN/cm² was $2.00 \times 10^{-3}$ S/cm.

3. Evaluation of Lithium Secondary Battery

A coin-type battery was produced using the positive electrode active material 5, and a cycle test was carried out. As a result, the discharge capacity at the 1st cycle, the discharge capacity at the 200th cycle and the discharge capacity maintenance ratio were respectively 155 mAh/g, 129 mAh/g and 83%.

Comparative Example 2

1. Production of Lithium-Containing Composite Metal Oxide 6

The dry powder of the nickel-cobalt-manganese composite hydroxide 1 obtained in Example 1 and a lithium carbonate powder were weighed such that Li/(Ni+Co+Mn)=1.05, followed by mixing. The resulting was calcined in ambient atmosphere at 900° C. for 10 hours, thereby obtaining a lithium-containing composite metal oxide 6 as an end product, i.e., lithium-nickel-cobalt-manganese composite oxide 6.

2. Evaluation of Lithium-Containing Composite Metal Oxide 6

The results of the composition analysis of the lithium-containing composite metal oxide 6 revealed that the molar ratio of Li:Ni:Mn:Co was 1.04:0.60:0.20:0.20.

The primary particle diameter and the volume-based 50% cumulative particle size $D_{50}$ of the lithium-containing composite metal oxide 6 were respectively 1.51 μm and 11.4 μm. Further, the volume-based 10% cumulative particle size $D_{10}$ and the volume-based 90% cumulative particle size $D_{90}$ were respectively 3.0 μm and 33.3 μm, and the ratio (D90/D10) was 11.1.

The crystallite sizes calculated from peak A and peak B of the lithium-containing composite metal oxide 6 were respectively 1,872 Å and 987 Å.

The BET specific surface area of the lithium-containing composite metal oxide 6 was 0.38 m$^2$/g, and the value of [(α/β)/1000] was 4.93.

The amounts of lithium hydroxide and lithium carbonate remaining in the lithium-containing composite metal oxide 6 were respectively 0.13° 6 by mass and 0.88% by mass.

The powder conductivity of the lithium-containing composite metal oxide 6 under pressure of 6.37 kN/cm$^2$ was 4.43×10$^{-1}$ S/cm.

3. Evaluation of Lithium Secondary Battery

A coin-type battery was produced using the positive electrode active material 6, and a cycle test was carried out. As a result, the discharge capacity at the 1st cycle, the discharge capacity at the 200th cycle and the discharge capacity maintenance ratio were respectively 135 mAh/g, 114 mAh/g and 84%.

The results of the evaluation show that the lithium secondary batteries using the lithium-containing composite metal oxides of Examples 1 to 4 as a positive electrode active material exhibited higher capacity than the lithium secondary battery using the lithium-containing composite metal oxide of Comparative Example 2 as a positive electrode active material.

The results of the evaluation also show that the lithium secondary batteries using the lithium-containing composite metal oxides of Examples 1 to 4 as a positive electrode active material exhibited improved cycle performance, as compared to the lithium secondary batteries using the lithium-containing composite metal oxides of Comparative Examples 1 and 2 as a positive electrode active material.

Example 5

1. Production of Lithium-Containing Composite Metal Oxide 7

Into a reaction vessel equipped with a stirrer and an overflow pipe was charged water, followed by addition of an aqueous sodium hydroxide solution. The temperature of the resulting liquid was maintained at 45° C.

An aqueous nickel sulfate solution, an aqueous cobalt sulfate solution and an aqueous manganese sulfate solution were mixed together such that the atomic ratio between nickel atoms, cobalt atoms and manganese atoms became 0.58:0.17:0.25, to thereby prepare a raw material mixture solution.

Then, the obtained raw material mixture solution and an aqueous ammonium sulfate solution as a complexing agent were continuously added to the reaction vessel with stirring, and an aqueous sodium hydroxide solution was dropwise added thereto at an appropriate timing such that the pH of the solution in the reaction vessel became 12.5, thereby obtaining nickel-cobalt-manganese composite hydroxide particles. The resulting particles were washed with water after filtration, and dried at 100° C., to thereby obtain a nickel-cobalt-manganese composite hydroxide 4 in the form of dry powder.

The BET specific surface area of the nickel-cobalt-manganese composite hydroxide 4 was 70.3 m$^2$/g.

The thus obtained dry powder of nickel-cobalt-manganese composite hydroxide 4 and a lithium carbonate powder were weighed such that Li/(Ni+Co+Mn)=1.05, followed by mixing. The resulting was calcined in ambient atmosphere at 760° C. for 5 hours, thereby obtaining a calcined product 7A. By calcining the calcined product 7A in oxygen atmosphere at 850° C. for 10 hours, a lithium-containing composite metal oxide 7 as an end product, i.e., lithium-nickel-cobalt-manganese composite oxide 7, was obtained.

2. Evaluation of Lithium-Containing Composite Metal Oxide 7

The results of the composition analysis of the lithium-containing composite metal oxide 7 revealed that the molar ratio of Li:Ni:Mn:Co was 1.13:0.58:0.25:0.17.

The primary particle diameter and the volume-based 50% cumulative particle size $D_{50}$ of the lithium-containing composite metal oxide 7 were respectively 0.35±μm and 4.6 μm. Further, the volume-based 10% cumulative particle size $D_{10}$ and the volume-based 90% cumulative particle size $D_{90}$ were respectively 2.4 μm and 8.8 μm, and the ratio (D90/D10) was 3.7.

The crystallite sizes calculated from peak A and peak B of the lithium-containing composite metal oxide 7 were respectively 848 Å and 488 Å.

The BET specific surface area of the lithium-containing composite metal oxide 7 was 0.79 m$^2$/g, and the value of [(α/β)/1000] was 1.07.

The amounts of lithium hydroxide and lithium carbonate remaining in the lithium-containing composite metal oxide 7 were respectively 0.60% by mass and 0.35% by mass.

The powder conductivity of the lithium-containing composite metal oxide 7 under pressure of 6.37 kN/cm$^2$ was 1.62×10$^{-3}$ S/cm.

3. Evaluation of Lithium Secondary Battery

A coin-type battery was produced using the positive electrode active material 7, and a cycle test was carried out. As a result, the discharge capacity at the 1st cycle, the discharge capacity at the 200th cycle and the discharge capacity maintenance ratio were respectively 149 mAh/g, 138 mAh/g and 93%.

Example 6

1. Production of Lithium-Containing Composite Metal Oxide 8

A nickel-cobalt-manganese composite hydroxide 5 was produced following the same procedure as in Example 5 except that the pH of the solution in the reaction vessel was adjusted to 12.7. The BET specific surface area of the nickel-cobalt-manganese composite hydroxide 5 was 75.3 m$^2$/g.

The thus obtained dry powder of nickel-cobalt-manganese composite hydroxide 5 and a lithium carbonate powder were weighed such that Li/(Ni+Co+Mn)=1.05, followed by mixing. The resulting was calcined in ambient atmosphere at 760° C. for 5 hours, thereby obtaining a calcined product 8A. By calcining the calcined product 8A in ambient atmosphere at 850° C. for 10 hours, a lithium-containing composite metal oxide 8 as an end product, i.e., lithium-nickel-cobalt-manganese composite oxide 8, was obtained.

2. Evaluation of Lithium-Containing Composite Metal Oxide 8

The results of the composition analysis of the lithium-containing composite metal oxide 8 revealed that the molar ratio of Li:Ni:Mn:Co was 1.12:0.58:0.25:0.17.

The primary particle diameter and the volume-based 50% cumulative particle size $D_{50}$ of the lithium-containing composite metal oxide 8 were respectively 0.33 μm and 4.8 μm. Further, the volume-based 10% cumulative particle size $D_{10}$ and the volume-based 90% cumulative particle size $D_{90}$ were respectively 2.3 μm and 10.0 μm, and the ratio (D90/D10) was 4.3.

The crystallite sizes calculated from peak A and peak B of the lithium-containing composite metal oxide 8 were respectively 847 Å and 505 Å.

The BET specific surface area of the lithium-containing composite metal oxide 8 was 0.81 m$^2$/g, and the value of [(α/β)/1000] was 1.05.

The amounts of lithium hydroxide and lithium carbonate remaining in the lithium-containing composite metal oxide 8 were respectively 0.64% by mass and 0.31% by mass.

The powder conductivity of the lithium-containing composite metal oxide 8 under pressure of 6.37 kN/cm$^2$ was 1.69×10$^{-3}$ S/cm.

3. Evaluation of Lithium Secondary Battery

A coin-type battery was produced using the positive electrode active material 8, and a cycle test was carried out. As a result, the discharge capacity at the 1st cycle, the discharge capacity at the 200th cycle and the discharge capacity maintenance ratio were respectively 151 mAh/g, 135 mAh/g and 89%.

Example 7

1. Production of Lithium-Containing Composite Metal Oxide 9

A nickel-cobalt-manganese composite hydroxide 6 was produced following the same procedure as in Example 5 except that the pH of the solution in the reaction vessel was adjusted to 12.6. The BET specific surface area of the nickel-cobalt-manganese composite hydroxide 6 was 80.9 m$^2$/g.

The thus obtained dry powder of nickel-cobalt-manganese composite hydroxide 6 and a lithium carbonate powder were weighed such that Li/(Ni+Co+Mn)=1.05, followed by mixing. The resulting was calcined in ambient atmosphere at 760° C. for 5 hours, thereby obtaining a calcined product 9A. By calcining the calcined product 9A in ambient atmosphere at 850° C. for 10 hours, a lithium-containing composite metal oxide 9 as an end product, i.e., lithium-nickel-cobalt-manganese composite oxide 9, was obtained.

2. Evaluation of Lithium-Containing Composite Metal Oxide 9

The results of the composition analysis of the lithium-containing composite metal oxide 9 revealed that the molar ratio of Li:Ni:Mn:Co was 1.10:0.58:0.25:0.17.

The primary particle diameter and the volume-based 50% cumulative particle size $D_{50}$ of the lithium-containing composite metal oxide 9 were respectively 0.30 μm and 3.0 μm. Further, the volume-based 10% cumulative particle size $D_{10}$ and the volume-based 90% cumulative particle size $D_{90}$ were respectively 1.7 μm and 5.4 μm, and the ratio (D90/D10) was 3.2.

The crystallite sizes calculated from peak A and peak B of the lithium-containing composite metal oxide 9 were respectively 848 Å and 496 Å.

The BET specific surface area of the lithium-containing composite metal oxide 9 was 1.20 m$^2$/g, and the value of [(α/β)/1000] was 0.71.

The amounts of lithium hydroxide and lithium carbonate remaining in the lithium-containing composite metal oxide 9 were respectively 0.62% by mass and 0.27% by mass.

The powder conductivity of the lithium-containing composite metal oxide 9 under pressure of 6.37 kN/cm$^2$ was 1.39×10$^{-3}$ S/cm.

3. Evaluation of Lithium Secondary Battery

A coin-type battery was produced using the positive electrode active material 9, and a cycle test was carried out. As a result, the discharge capacity at the 1st cycle, the discharge capacity at the 200th cycle and the discharge capacity maintenance ratio were respectively 150 mAh/g, 138 mAh/g and 92%.

The results of the evaluation show that the lithium secondary batteries using the lithium-containing composite metal oxides of Examples 5 to 7 as a positive electrode active material exhibited higher capacity than the lithium secondary battery using the lithium-containing composite metal oxide of Comparative Example 2 as a positive electrode active material.

The results of the evaluation also show that the lithium secondary batteries using the lithium-containing composite metal oxides of Examples 5 to 7 as a positive electrode active material exhibited higher cycle performance than the lithium secondary batteries using the lithium-containing composite metal oxides of Comparative Examples 1 and 2 as a positive electrode active material.

Example 8

1. Production of Lithium-Containing Composite Metal Oxide 10

Into a reaction vessel equipped with a stirrer and an overflow pipe was charged water, followed by addition of an aqueous sodium hydroxide solution. The temperature of the resulting liquid was maintained at 50° C.

An aqueous nickel sulfate solution, an aqueous cobalt sulfate solution and an aqueous manganese sulfate solution were mixed together such that the atomic ratio between nickel atoms, cobalt atoms and manganese atoms became 0.55:0.21:0.24, to thereby prepare a raw material mixture solution.

Then, the obtained raw material mixture solution and an aqueous ammonium sulfate solution as a complexing agent were continuously added to the reaction vessel with stirring, and an aqueous sodium hydroxide solution was dropwise added thereto at an appropriate timing such that the pH of the solution in the reaction vessel became 12.0, thereby obtaining nickel-cobalt-manganese composite hydroxide particles 7. The resulting particles were washed with water after filtration, and dried at 100° C., to thereby obtain a nickel-cobalt-manganese composite hydroxide 7 in the form of dry powder.

The BET specific surface area of the nickel-cobalt-manganese composite hydroxide 7 was 60.3 m²/g.

The thus obtained dry powder of nickel-cobalt-manganese composite hydroxide 7 and a lithium carbonate powder were weighed such that Li/(Ni+Co+Mn)=1.02, followed by mixing. The resulting was calcined in ambient atmosphere at 760° C. for 5 hours, thereby obtaining a calcined product 10A. By calcining the calcined product 10A in ambient atmosphere at 850° C. for 10 hours, a lithium-containing composite metal oxide 10 as an end product, i.e., lithium-nickel-cobalt-manganese composite oxide 10, was obtained.

2. Evaluation of Lithium-Containing Composite Metal Oxide 10

The results of the composition analysis of the lithium-containing composite metal oxide 10 revealed that the molar ratio of Li:Ni:Mn:Co was 1.07:0.55:0.24:0.21.

The primary particle diameter and the volume-based 50% cumulative particle size $D_{50}$ of the lithium-containing composite metal oxide 10 were respectively 0.25 μm and 3.2 μm. Further, the volume-based 10% cumulative particle size $D_{10}$ and the volume-based 90% cumulative particle size $D_{90}$ were respectively 1.9 μm and 5.5 μm, and the ratio (D90/D10) was 2.9.

The crystallite sizes calculated from peak A and peak B of the lithium-containing composite metal oxide 10 were respectively 805 Å and 496 Å.

The BET specific surface area of the lithium-containing composite metal oxide 10 was 1.75 m²/g, and the value of [(α/β)/1000] was 0.46.

The amounts of lithium hydroxide and lithium carbonate remaining in the lithium-containing composite metal oxide 10 were respectively 0.24% by mass and 0.34% by mass.

The powder conductivity of the lithium-containing composite metal oxide 10 under pressure of 6.37 kN/cm² was $1.46 \times 10^{-3}$ S/cm.

3. Evaluation of Lithium Secondary Battery

A coin-type battery was produced using the positive electrode active material 10, and a cycle test was carried out. As a result, the discharge capacity at the 1st cycle, the discharge capacity at the 200th cycle and the discharge capacity maintenance ratio were respectively 151 mAh/g, 143 mAh/g and 90%.

Example 9

1. Production of Lithium-Containing Composite Metal Oxide 11

Into a reaction vessel equipped with a stirrer and an overflow pipe was charged water, followed by addition of an aqueous sodium hydroxide solution. The temperature of the resulting liquid was maintained at 50° C.

An aqueous nickel sulfate solution, an aqueous cobalt sulfate solution and an aqueous manganese sulfate solution were mixed together such that the atomic ratio between nickel atoms, cobalt atoms and manganese atoms became 0.55:0.21:0.24, to thereby prepare a raw material mixture solution.

Then, the obtained raw material mixture solution and an aqueous ammonium sulfate solution as a complexing agent were continuously added to the reaction vessel with stirring, and an aqueous sodium hydroxide solution was dropwise added thereto at an appropriate timing such that the pH of the solution in the reaction vessel became 12.1, thereby obtaining nickel-cobalt-manganese composite hydroxide particles. The resulting particles were washed with water after filtration, and dried at 100° C., to thereby obtain a nickel-cobalt-manganese composite hydroxide 8 in the form of dry powder.

The BET specific surface area of the nickel-cobalt-manganese composite hydroxide 8 was 82.5 m²/g.

The thus obtained dry powder of nickel-cobalt-manganese composite hydroxide 8 and a lithium carbonate powder were weighed such that Li/(Ni+Co+Mn)=1.02, followed by mixing. The resulting was calcined in ambient atmosphere at 760° C. for 5 hours, thereby obtaining a calcined product 11A. By calcining the calcined product 11A in ambient atmosphere at 850° C. for 10 hours, a lithium-containing composite metal oxide 11 as an end product, i.e., lithium-nickel-cobalt-manganese composite oxide 11, was obtained.

2. Evaluation of Lithium-Containing Composite Metal Oxide 11

The results of the composition analysis of the lithium-containing composite metal oxide 11 revealed that the molar ratio of Li:Ni:Mn:Co was 1.07:0.55:0.24:0.21.

The primary particle diameter and the volume-based 50% cumulative particle size $D_{50}$ of the lithium-containing composite metal oxide 11 were respectively 0.21 μm and 2.9 μm. Further, the volume-based 10% cumulative particle size $D_{10}$ and the volume-based 90% cumulative particle size $D_{90}$ were respectively 1.9 μm and 4.5 μm, and the ratio (D90/D10) was 2.4.

The crystallite sizes calculated from peak A and peak B of the lithium-containing composite metal oxide 11 were respectively 774 Å and 514 Å.

The BET specific surface area of the lithium-containing composite metal oxide 11 was 2.34 m²/g, and the value of [(α/β)/1000] was 0.33.

The amounts of lithium hydroxide and lithium carbonate remaining in the lithium-containing composite metal oxide 11 were respectively 0.27% by mass and 0.35% by mass.

The powder conductivity of the lithium-containing composite metal oxide 11 under pressure of 6.37 kN/cm² was $0.95 \times 10^{-3}$ S/cm.

3. Evaluation of Lithium Secondary Battery

A coin-type battery was produced using the positive electrode active material 11, and a cycle test was carried out. As a result, the discharge capacity at the 1st cycle, the discharge capacity at the 200th cycle and the discharge capacity maintenance ratio were respectively 147 mAh/g, 131 mAh/g and 89%.

The results of the evaluation show that the lithium secondary batteries using the lithium-containing composite metal oxides of Examples 8 and 9 as a positive electrode active material exhibited higher capacity than the lithium secondary battery using the lithium-containing composite metal oxide of Comparative Example 2 as a positive electrode active material.

The results of the evaluation also show that the lithium secondary batteries using the lithium-containing composite metal oxides of Examples 8 and 9 as a positive electrode active material exhibited higher cycle performance than the lithium secondary batteries using the lithium-containing composite metal oxides of Comparative Examples 1 and 2 as a positive electrode active material.

The results of the Examples and Comparative Examples are summarized in Tables 1 to 3. In Table 2, "lithium carbonate content" and "lithium hydroxide content" respectively denote the amounts of lithium carbonate and lithium hydroxide contained in the residual alkali one the particle surfaces measured by the neutralization titration. Further, "sum of lithium hydroxide content and lithium carbonate content" denotes the sum of the lithium carbonate content and the lithium hydroxide content which were measured by the aforementioned method.

TABLE 1

|  | Primary Particle Diameter (μm) | $D_{50}$ (μm) | $D_{10}$ (μm) | $D_{90}$ (μm) | $D_{90}/D_{10}$ | $(D_{90} - D_{10})/D_{50}$ |
|---|---|---|---|---|---|---|
| Example 1 | 0.28 | 6.4 | 3.2 | 12.4 | 3.9 | 1.44 |
| Example 2 | 0.42 | 5.5 | 2.4 | 13.2 | 5.5 | 1.96 |
| Example 3 | 0.32 | 5.2 | 2.4 | 8.4 | 3.5 | 1.15 |
| Example 4 | 0.40 | 5.1 | 2.6 | 9.8 | 3.8 | 1.41 |
| Example 5 | 0.35 | 4.6 | 2.4 | 8.8 | 3.7 | 1.39 |
| Example 6 | 0.33 | 4.8 | 2.3 | 10.0 | 4.3 | 1.60 |
| Example 7 | 0.30 | 3.0 | 1.7 | 5.4 | 3.2 | 1.23 |
| Example 8 | 0.25 | 3.2 | 1.9 | 5.5 | 2.9 | 1.13 |
| Example 9 | 0.21 | 2.9 | 1.9 | 4.5 | 2.4 | 0.90 |
| Comparative Example 1 | 0.35 | 11.9 | 4.7 | 31.4 | 6.7 | 2.24 |
| Comparative Example 2 | 1.51 | 11.4 | 3.0 | 33.3 | 11.1 | 2.66 |

TABLE 2

|  | BET Specific Surface Area ($m^2/g$) | Crystallite Size Peak A (Å) | $(\alpha/\beta)/100$ | Lithium Hydroxide Content (wt %) | Lithium Carbonate Content (wt %) | Sum of Lithium Hydroxide Content and Lithium Carbonate Content | Powder Conductivity (S/cm) |
|---|---|---|---|---|---|---|---|
| Ex. 1 | 0.60 | 700 | 1.17 | 0.17 | 0.14 | 0.31 | $1.22 \times 10^{-2}$ |
| Ex. 2 | 1.00 | 857 | 0.86 | 0.30 | 0.76 | 1.06 | $3.86 \times 10^{-3}$ |
| Ex. 3 | 0.60 | 789 | 1.32 | 0.40 | 0.22 | 0.62 | $4.72 \times 10^{-3}$ |
| Ex. 4 | 0.79 | 866 | 1.10 | 0.47 | 0.35 | 0.82 | $3.03 \times 10^{-3}$ |
| Ex. 5 | 0.79 | 848 | 1.07 | 0.60 | 0.35 | 0.95 | $1.62 \times 10^{-3}$ |
| Ex. 6 | 0.81 | 847 | 1.05 | 0.64 | 0.31 | 0.95 | $1.69 \times 10^{-3}$ |
| Ex. 7 | 1.20 | 848 | 0.71 | 0.62 | 0.27 | 0.89 | $1.39 \times 10^{-3}$ |
| Ex. 8 | 1.75 | 805 | 0.46 | 0.24 | 0.34 | 0.58 | $1.46 \times 10^{-3}$ |
| Ex. 9 | 2.34 | 774 | 0.33 | 0.27 | 0.35 | 0.62 | $0.95 \times 10^{-3}$ |
| Comp. Ex. 1 | 0.58 | 1365 | 2.35 | 0.17 | 1.60 | 1.77 | $2.00 \times 10^{-3}$ |
| Comp. Ex. 2 | 0.38 | 1872 | 4.93 | 0.13 | 0.88 | 1.01 | $4.43 \times 10^{-3}$ |

TABLE 3

|  | Discharge Capacity at the 1st Cycle (mAh/g) | Discharge Capacity at the 200th Cycle (mAh/g) | Discharge Capacity Maintenance Ratio (%) |
|---|---|---|---|
| Example 1 | 151 | 139 | 92 |
| Example 2 | 150 | 130 | 87 |
| Example 3 | 154 | 139 | 90 |
| Example 4 | 153 | 137 | 90 |
| Example 5 | 149 | 138 | 93 |
| Example 6 | 151 | 135 | 89 |
| Example 7 | 150 | 138 | 92 |
| Example 8 | 151 | 143 | 90 |
| Example 9 | 147 | 131 | 89 |
| Comparative Example 1 | 155 | 129 | 83 |
| Comparative Example 2 | 135 | 114 | 84 |

DESCRIPTION OF THE REFERENCE SIGNS

1 Separator
2 Positive electrode
3 Negative electrode
4 Electrode group
5 Battery can
6 Electrolytic liquid
7 Top insulator
8 Sealing body
10 Lithium secondary battery
21 Positive electrode lead
31 Negative electrode lead

The invention claimed is:

1. A positive electrode active material for a lithium secondary battery, having a layered structure and comprising at least nickel, cobalt and manganese, the positive electrode active material satisfying requirements (1) to (3) below:
   (1) a primary particle size of 0.1 μm to 1 μm, and a 50% cumulative particle size $D_{50}$ of 1 μm to 10 μm,
   (2) a ratio ($D_{90}/D10$) of volume-based 90% cumulative particle size $D_{90}$ to volume-based 10% cumulative particle size $D_{10}$, of 2 to 6, and
   (3) a lithium carbonate content in a residual alkali on particle surfaces of 0.10% by mass to 0.8% by mass as measured by neutralization titration.

2. The positive electrode active material according to claim 1, wherein a value obtained by formula $(\alpha/\beta)/1000$, representing a relationship between crystallite size $\alpha$ (Å) within a peak region of $2\theta=18.7\pm1°$ in a powder X-ray diffraction measurement using CuKα radiation and BET specific surface area $\beta$ ($m^2/g$), is 0.5 to 2.3.

3. The positive electrode active material according to claim 1, wherein the BET specific surface area $\beta$ is 0.1 $m^2/g$ to 2.0 $m^2/g$.

4. The positive electrode active material according to claim 1, wherein the crystallite size $\alpha$ (Å) within a peak region of $2\theta=18.7\pm1°$ in a powder X-ray diffraction measurement using CuKα radiation is 600 Å to 1,400 Å.

5. The positive electrode active material according to claim 1, wherein a total content of lithium carbonate and lithium hydroxide in a residual alkali on particle surfaces as measured by neutralization titration is 0.2% by mass to 1.5% by mass.

6. The positive electrode active material according to claim 1, wherein a value of $(D_{90}-D_{10})/D_{50}$, representing a relationship between the volume-based 10% cumulative particle size $D_{10}$, the volume-based 50% cumulative particle size $D_{50}$ and the 90% cumulative diameter $D_{90}$, is 1.00 to 2.20.

7. The positive electrode active material according to claim 1, wherein powder conductivity under pressure of 6.37 kN/cm$^2$ is $1\times10^{-3}$ S/cm to $1\times10^{-1}$ S/cm.

8. The positive electrode active material according to claim 1, which has a composition represented by formula (1) below:

(I)

wherein $0.9 \leq a \leq 1.2$, $0 < x < 0.4$, $0 < y < 0.4$, $0 \leq z < 0.1$, $0.5 < 1-x-y-z \leq 0.65$, and M is at least one metal selected from the group consisting of Mg, Al and Zr.

9. A positive electrode for a lithium secondary battery, comprising the positive electrode active material of claim 1.

10. A lithium secondary battery, comprising the positive electrode of claim 9.

* * * * *